Oct. 6, 1936.  W. B. STOUT  2,056,217
RAILWAY CAR
Filed Sept. 2, 1933  10 Sheets-Sheet 3
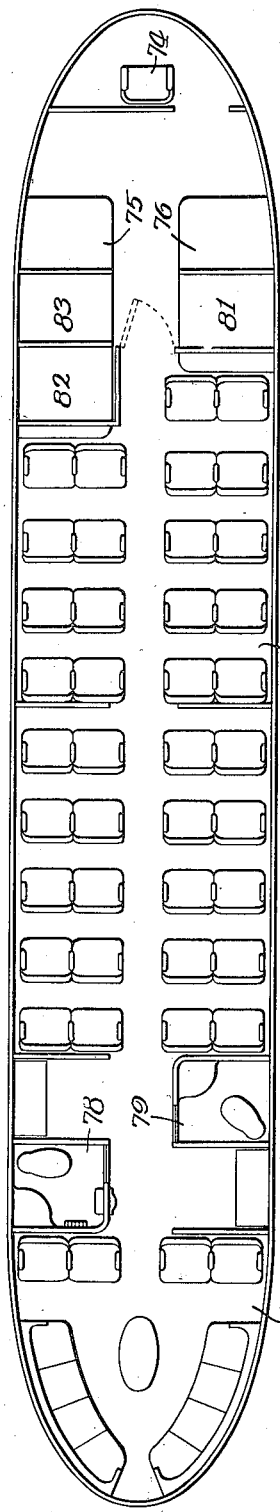
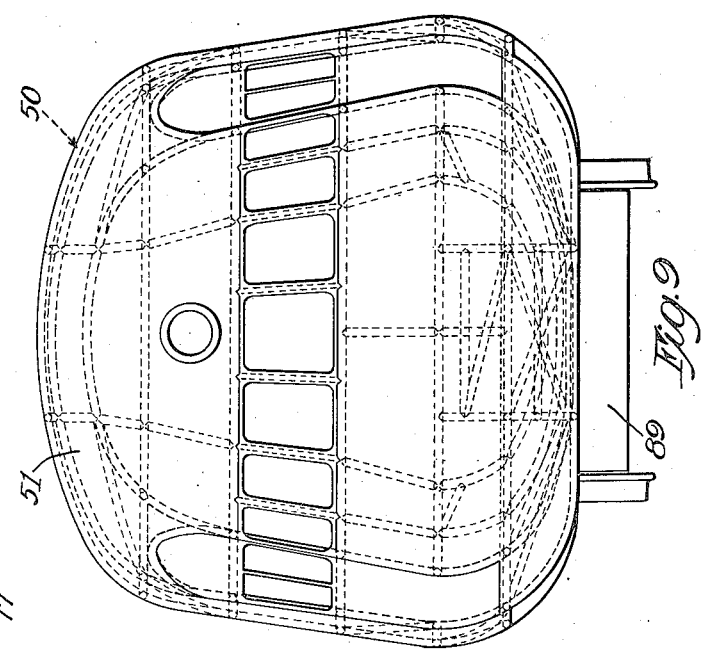
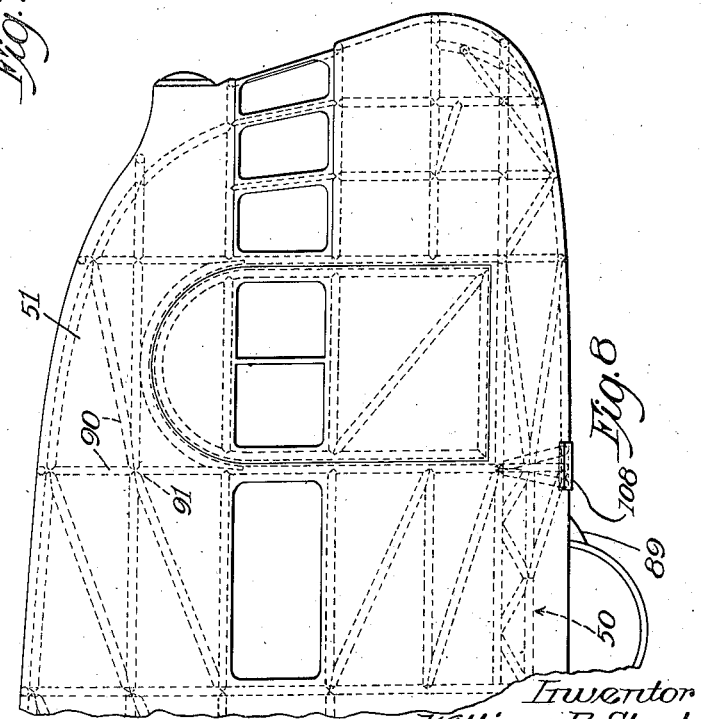

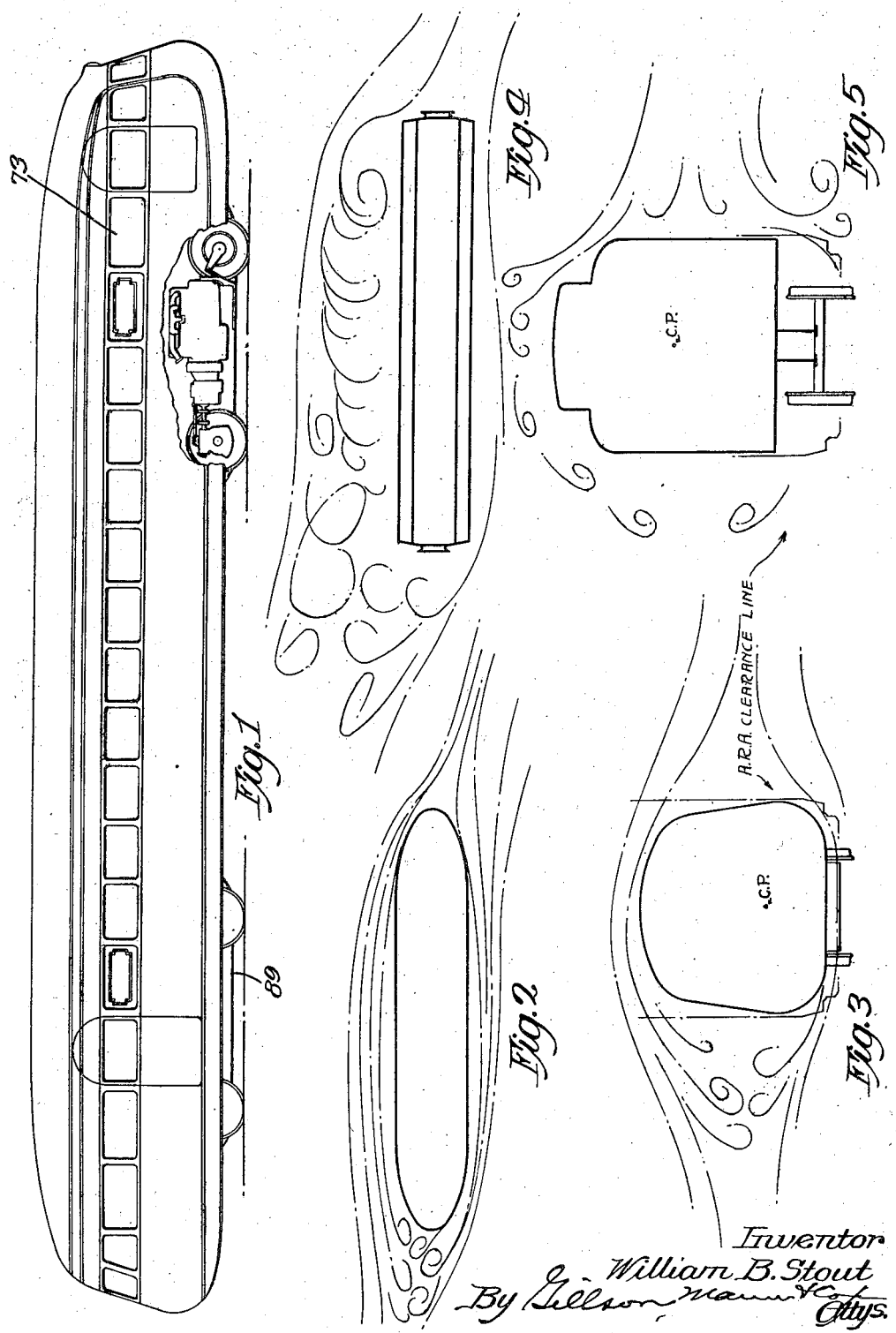

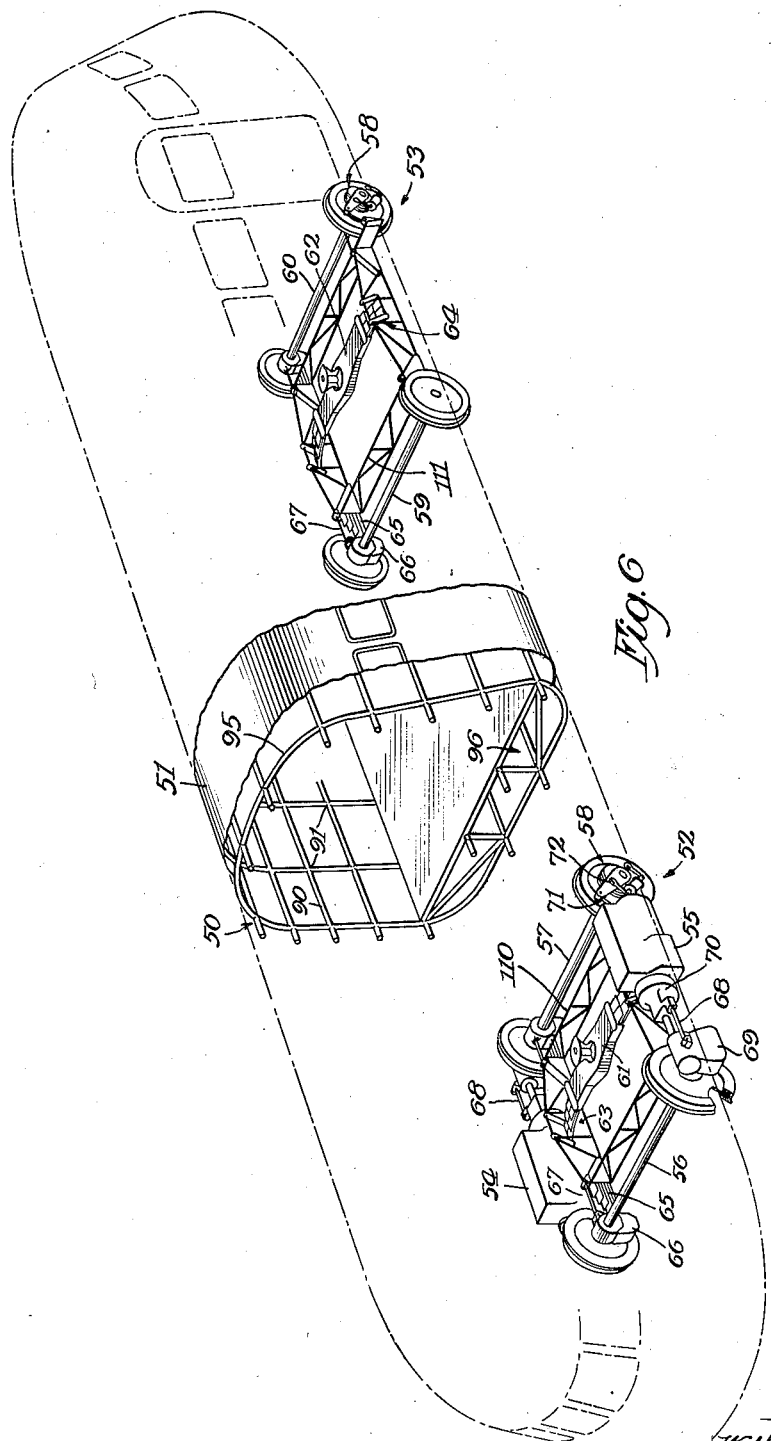

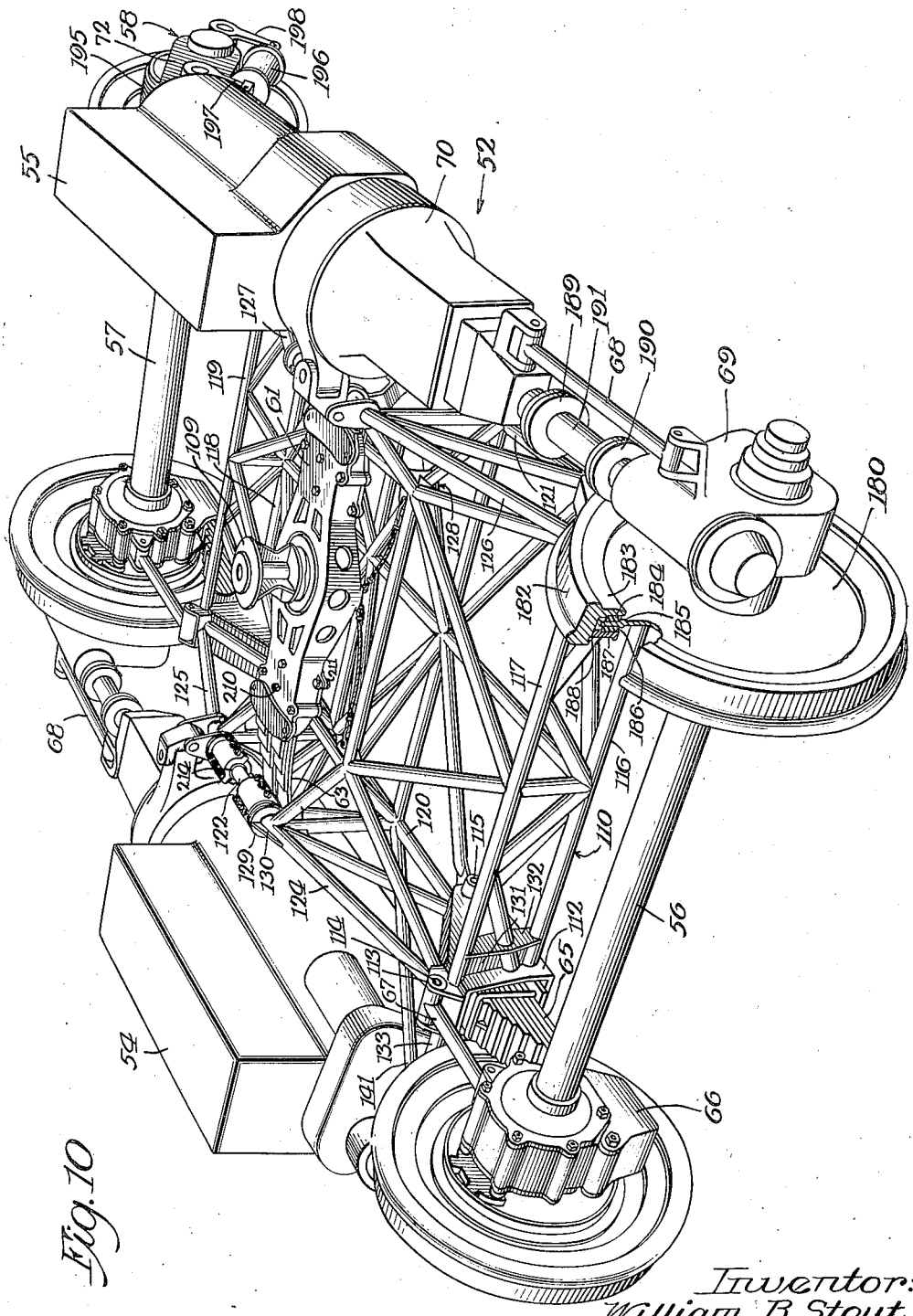

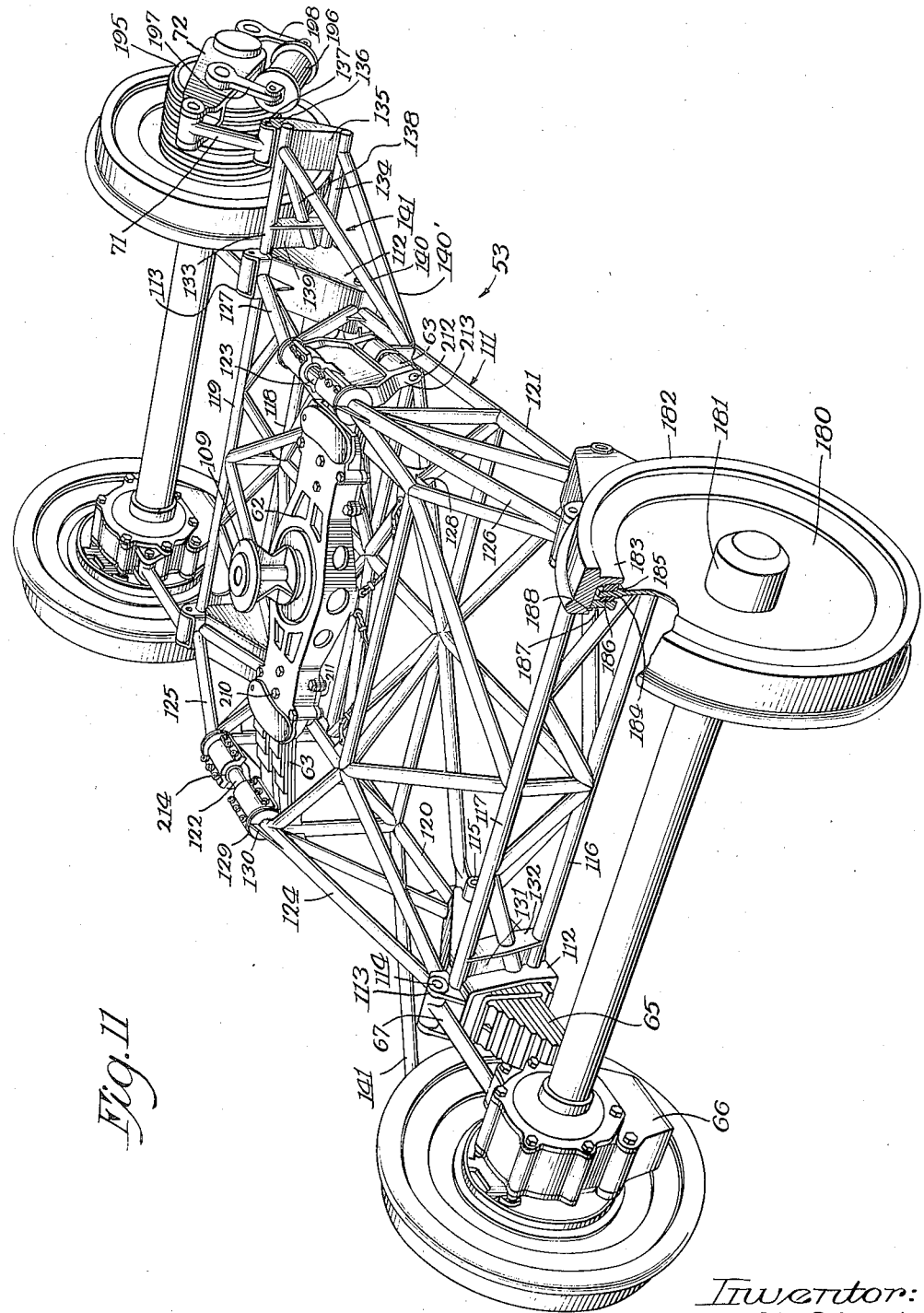

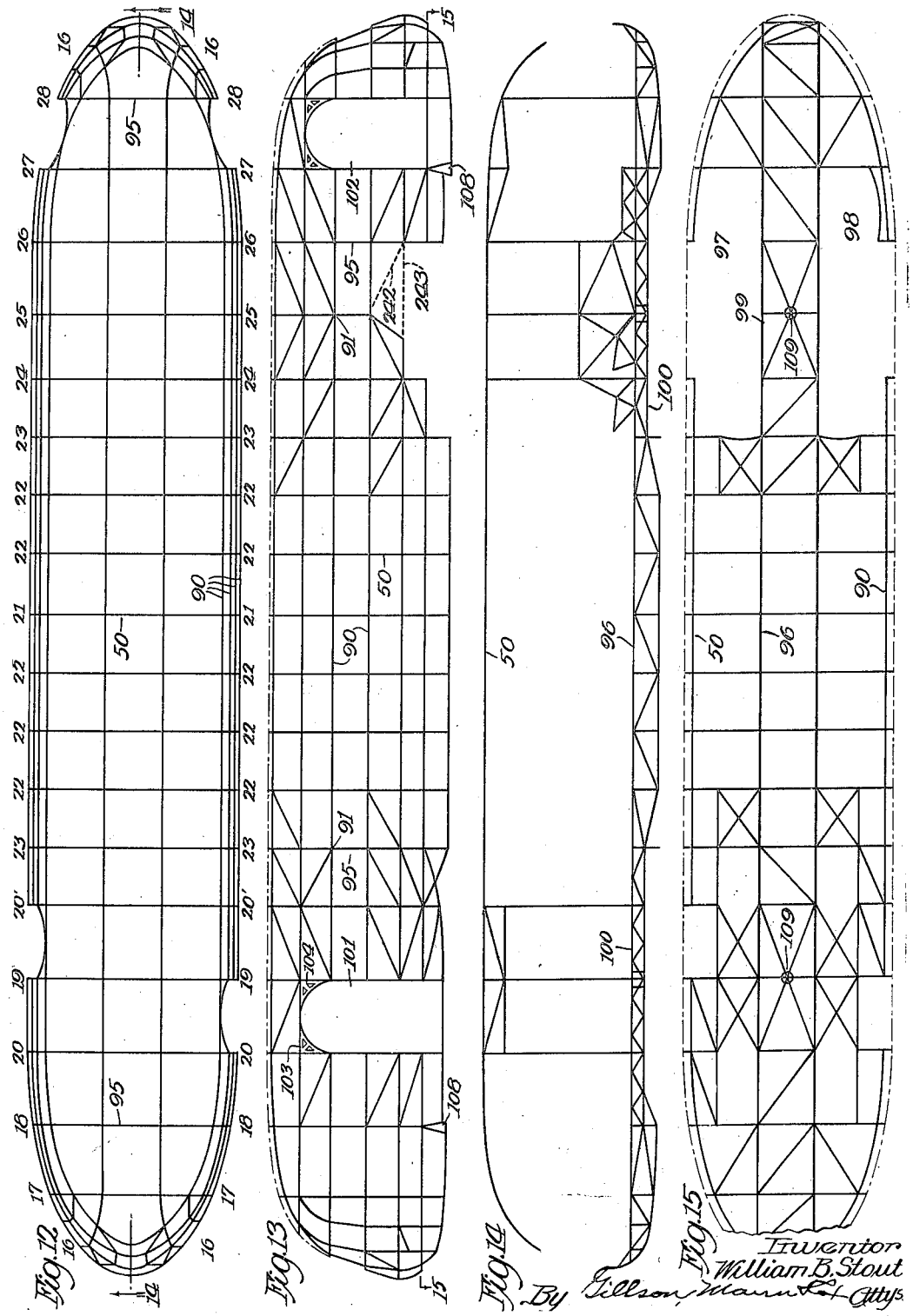

Oct. 6, 1936. W. B. STOUT 2,056,217
RAILWAY CAR
Filed Sept. 2, 1933 10 Sheets-Sheet 7
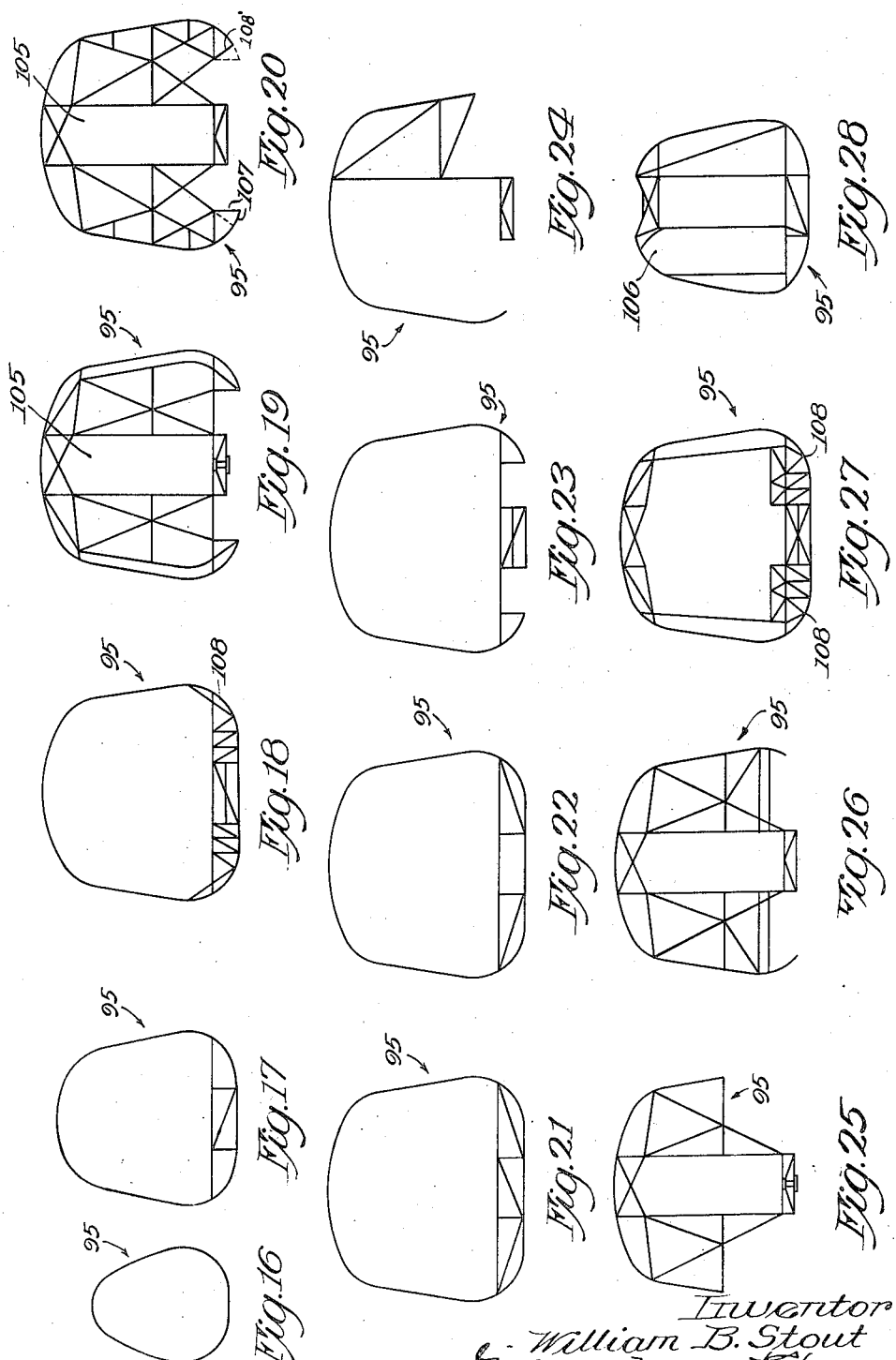

Oct. 6, 1936.   W. B. STOUT   2,056,217
RAILWAY CAR
Filed Sept. 2, 1933   10 Sheets-Sheet 9
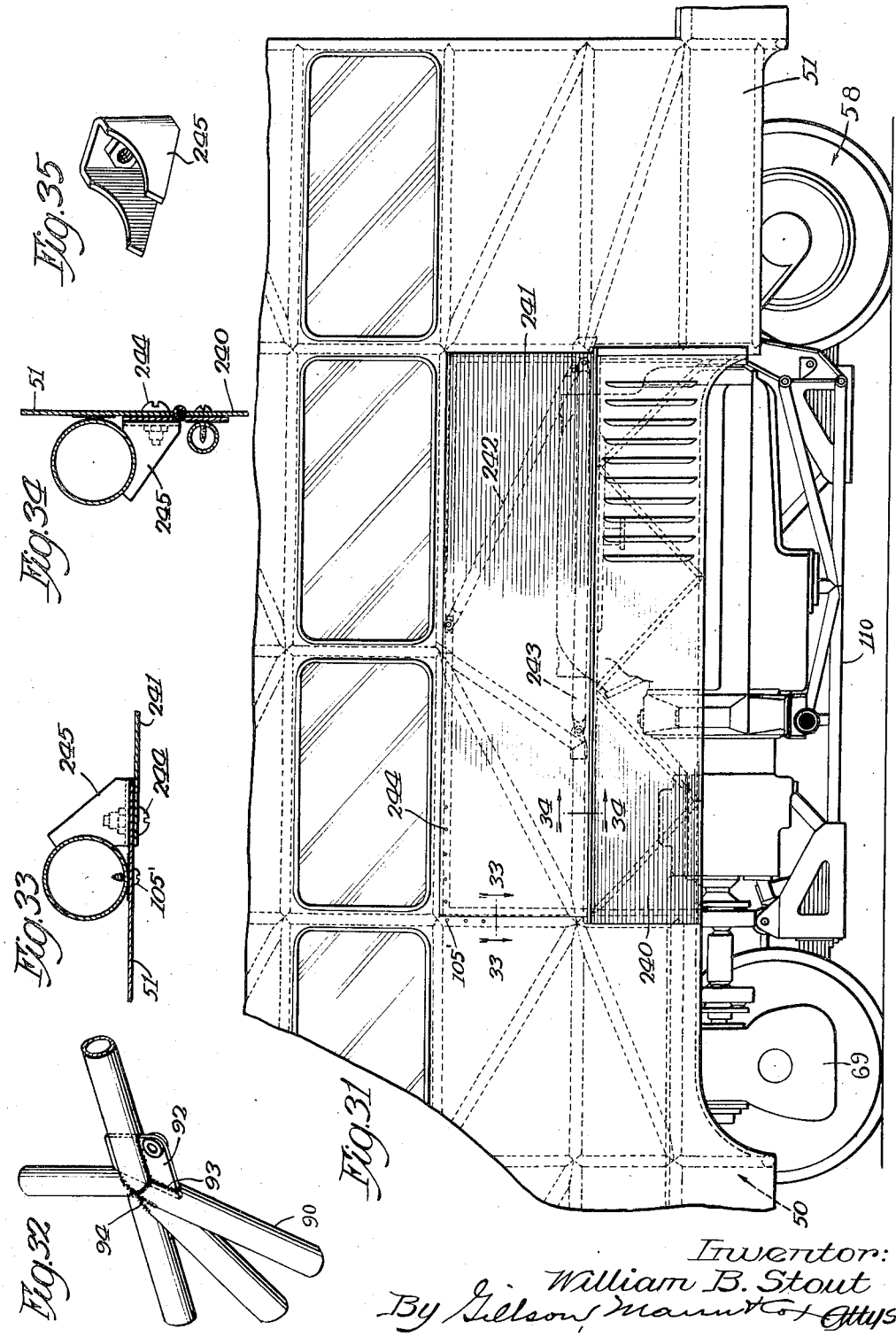
Inventor:
William B. Stout
By Gilson, Mann & Co. Attys

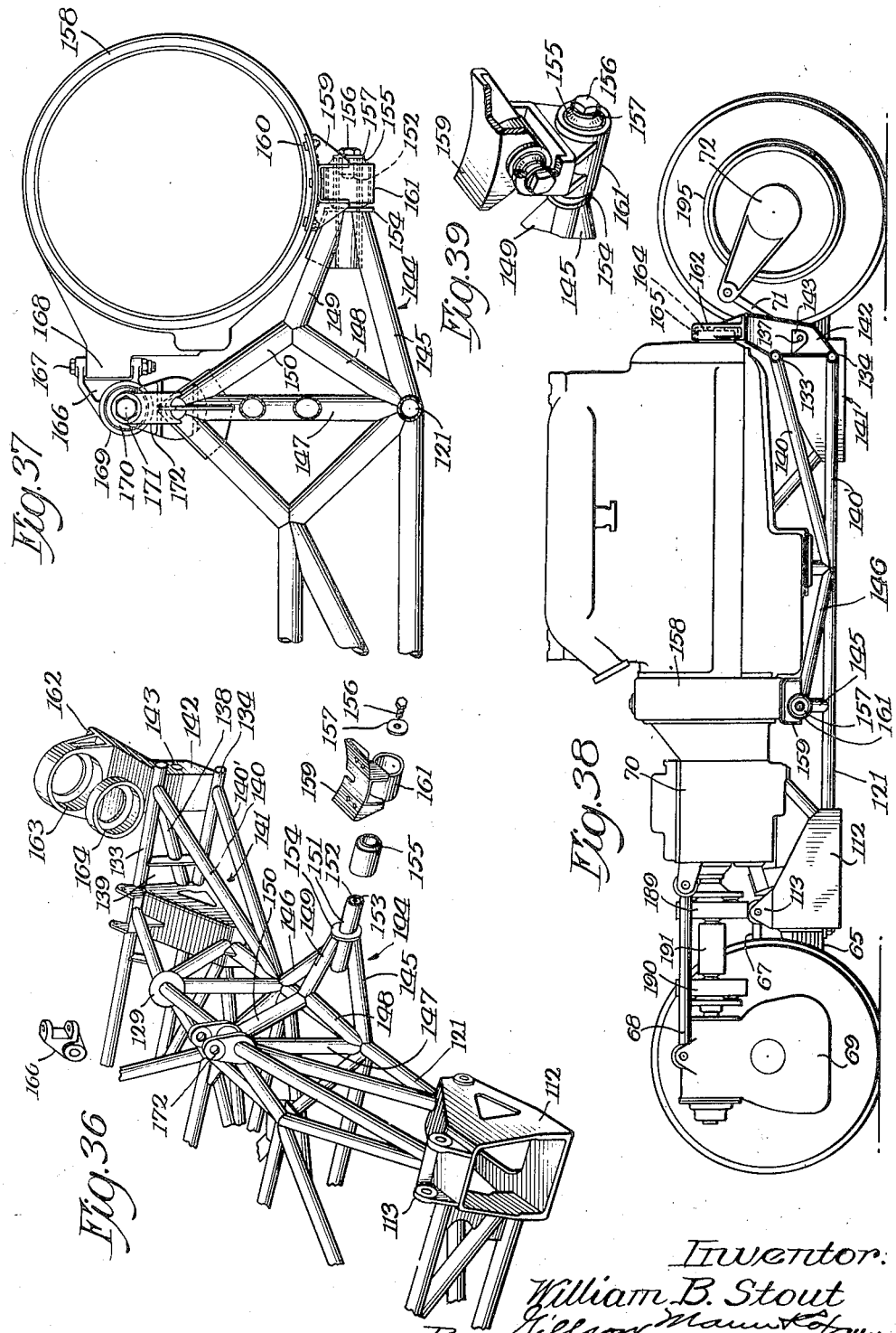

Patented Oct. 6, 1936

2,056,217

UNITED STATES PATENT OFFICE 2,056,217

RAILWAY CAR

William B. Stout, Detroit, Mich., assignor to Pullman-Standard Car Manufacturing Company, a corporation of Delaware Application September 2, 1933, Serial No. 687,999

7 Claims. (Cl. 105—2)

The improvements in air craft made in the last few years by using shapes and lines united to the performance sought have stimulated the interest of automotive engineers in reforming their designs, and salesmen have again made "stream-lining" a theme of sales talk with customary misuse to the deception of the ever gullible public that still buys many oddities as stream-line cars. But the fact is that the drop-shaped streamlined body is not suitable for automotive vehicles in general, and is hardly applicable at all to rail cars.

The swiftest bird is shaped for movement through the air that supports it and, in effect, becomes an enveloping stream flowing over the bird from front to rear. The fastest fish is built to move through a supporting stream of water running from head to tail. These natural shapes are streamlined to suit air in one instance, and water in the other. They teach much about air and submarine craft, but give little help on a rail car or train.

A land vehicle is supported on the solid ground and runs through air which has varying motion relative to the land in one respect and relative to the train in another respect; and the air near the ground has different pressure characteristics from free air well above the ground.

The crab and turtle are shaped to rest or move on the earth and let the water flow over them in any direction with little resistance. But water is noncompressible and its motion relative to the crab or turtle is slow—measured in feet or inches per minute. Air, on the other hand, is compressible, and often moves rapidly relative to the earth on which the vehicle is propelled in another direction at high speed.

Theoretically the contour of a car should minimize the resistance of air without regard to the relative direction of flow; and if railroads could be built anew without regard to cost, many problems could be avoided, but any new rail car or train must run on existing tracks within existing track clearances and provide suitable additional room for passengers and space for freight.

Car resistance is made up of parts due to weight (gravity) that appear as track resistance, journal friction, etc., and also parts due to the size and shape of the car that determine the rearward components of wind, actual or relative, and low pressure areas induced by the movement of the car with respect to the air.

Slow motion moving pictures of a track under a passing train of conventional weight, reveal a movement not unlike that of a primitive suspension bridge when people walk over it. The cause and the remedy for track and roadbed difficulties are easily determined from such pictures. The excessive weight is the destroyer and must be reduced.

The parts of car resistance in the second group are complicated by the fact that the path of the car, although through the air, is in the vicinity of the earth in shapes that vary from a tunnel through a cut to ties and ballast on a fill or a bridge. Each of these shapes has its own peculiar reaction with the passing car and the intervening air, and makes resistance in proportion as the adjacent surface of the car and the earth approach the relation of a turbine run backwards.

The turbine effect is particularly noticeable between the broken, irregular underside of conventional cars and the cross ties and ballast over which it travels.

Wind pressure from the side, either directly, or any position having a transverse component, has a peculiar effect, of which little has been learned, because the great weight of conventional cars has prevented these transverse forces from showing their real over-turning tendencies.

But the reduction in weight of conventional structures would reveal a new problem:—keeping the cars from being blown over.

It is peculiar, but none the less true, that a head-wind at approximately 16° from the direction of travel produces the greatest overturning effect. This is because the pressure on the windward side is aided by the suction or low pressure produced on the opposite side. The conventional car shape fosters this condition both by presenting large flat areas on the windward side and by presenting obstructions of almost every kind to the easy flow of the air from the windward side to the leeward side, which would tend to maintain substantially uniform pressures at opposite sides.

The principal object of this invention is to make a car, of a given load capacity, lighter without loss of strength and shock resistance, and faster with less power as compared with prior cars, and also able to hold the track in spite of the greater relative wind velocity at angles to the line of travel which arise from the increased speed, all with appropriate cost; and otherwise suited to existing conditions.

Further and other objects and advantages will become apparent as the disclosure proceeds, and the description is read in conjunction with the accompanying drawings, in which Fig. 1 is a side, elevational view of a preferred form of the invention, a fragment of the body being broken away to expose one of the driving motors;

Fig. 2 illustrates in plan the air currents that result from the car moving against a 16° wind, the car being shown as moving toward the right in said figure;

Fig. 3 illustrates the passage of air currents above and beneath the car;

Fig. 4 represents a standard Pullman car moving against a 16° wind;

Fig. 5 illustrates the effect of a cross wind on a standard Pullman car, the scale being the same as that in Fig. 3;

Fig. 6 is a diagrammatic, perspective view showing the general organization of the car;

Fig. 7 is a plan view showing the interior of the car;

Fig. 8 is an enlarged, side elevational view of the car nose, the structural framework being shown in dotted lines;

Fig. 9 is a front end view of the car;

Fig. 10 is a perspective view of the front truck;

Fig. 11 is a perspective view of the rear truck;

Figs. 12 and 13 are diagrammatic plan and side elevational views, respectively, of the body framework;

Figure 29:
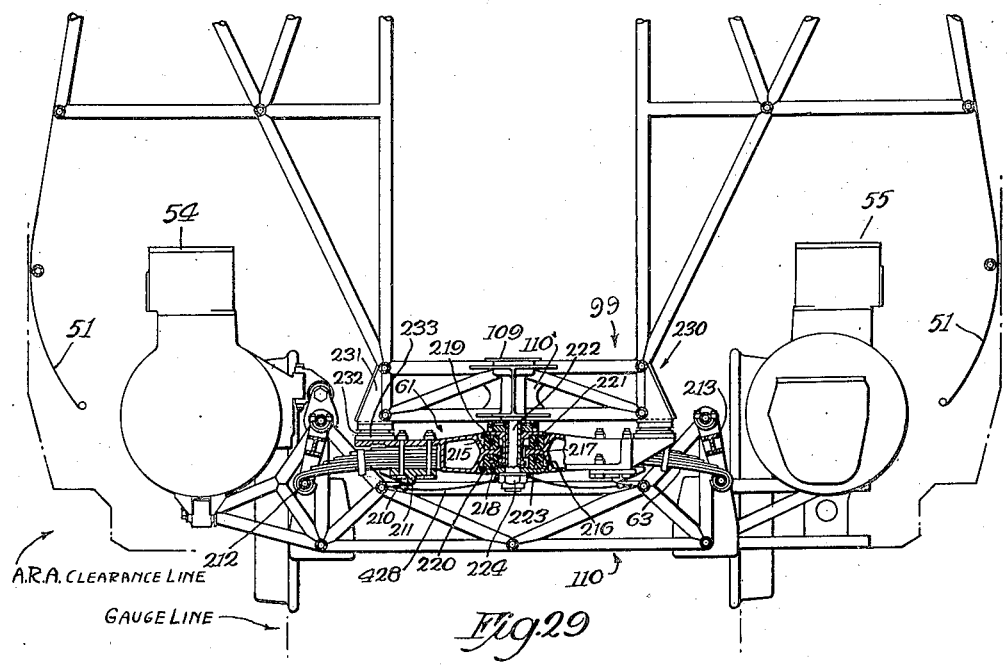
Figure 30:
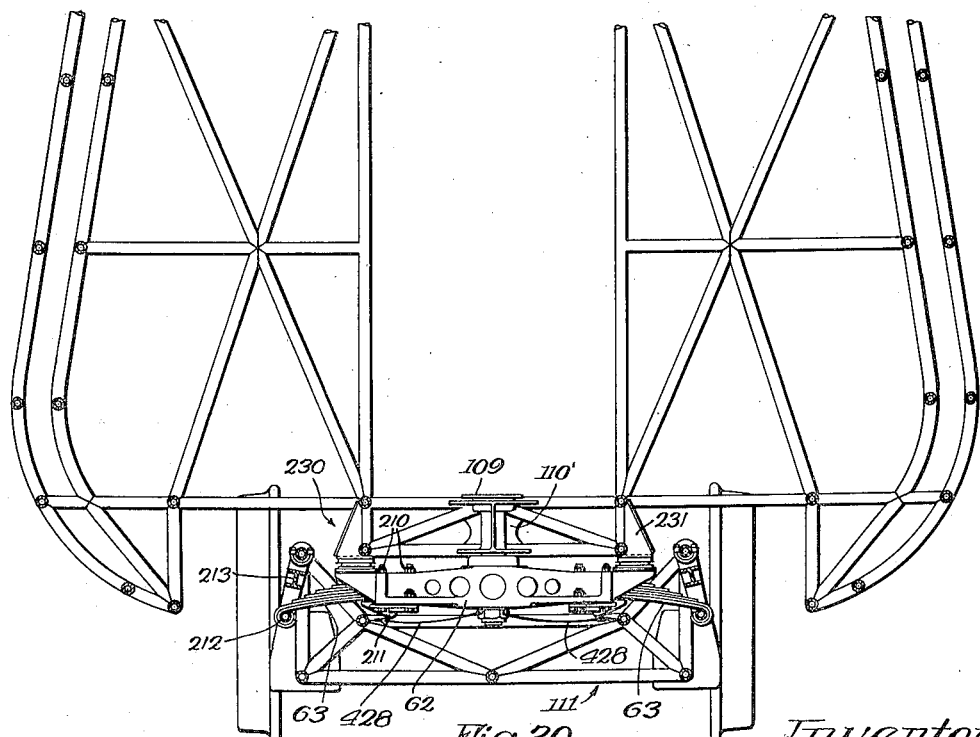

Figs. 14 and 15 are diagrammatic vertical and horizontal longitudinal sectional views, respectively, of the body framework, the sections being taken on the lines 14—14 and 15—15, respectively, of Figs. 12 and 13;

Figs. 16–28 inclusive are diagrammatic transverse, cross sectional views of the body framework, the several views being taken on section lines (Fig. 12) corresponding to the respective figure numbers, and like cross sections being indicated by like section numbers;

Fig. 29 is a fragmentary transverse cross sectional view through the center bearing of the front truck, a portion of the bolster being shown in elevation;

Fig. 30 is a corresponding view taken through the center bolster of the rear truck;

Fig. 31 is a fragmentary, side elevational view showing the removable panel which affords ready access to the driving motor;

Fig. 32 is a perspective view of one of the welded tube joints;

Fig. 33 is a sectional view taken on the line 33—33 of Fig. 31, illustrating the application of the metal skin to the body framework;

Fig. 34 is a sectional view taken on the line 34—34 of Fig. 31, illustrating how the lower portion of the removable panel is hinged to permit inspection of the motor;

Fig. 35 is a perspective view of one of the brackets which secures the metal skin to the body framework;

Fig. 36 is a perspective view showing the means employed for mounting one of the driving engines on the car truck;

Fig. 37 is a sectional view showing the rear motor mountings;

Fig. 38 is a side elevational view of the front truck, showing particularly the relationship of the front and rear motor supports; and Fig. 39 is a perspective view of a modified rear motor support.

At the outset it should be understood that the selection of certain preferred and modified forms of the invention for illustration and description is merely for the purpose of disclosure, for the invention may be variously embodied within the scope of the appended claims. Limitations, therefore, are not to be read into the claims unless required by the prior art.

*General organization (Figs. 1 and 6, particularly)*

It has already been mentioned that high speed and light weight are two of the foremost objects of this invention. But in addition, due consideration must be given to safety of operation, and to the cost of manufacture.

The first broad principle that is utilized in achieving the goal of this invention is to place the operating power as close as possible to its point of application so that not only is the center of gravity of the car kept relatively low, but also it becomes unnecessary to supply the heavy supporting structure that would otherwise be required if the driving equipment were placed at a higher level. Accordingly, a direct drive is used with the power plant mounted on one of the car trucks.

The second broad concept is to divide the power plant into at least two units so that they may be mounted at the sides of the truck, and consequently permit the car body to rest relatively low on the supporting trucks. This arrangement, besides placing the principal weight close to the track, has the further advantage that passenger space is not sacrificed in the attainment of a lower center of gravity.

The mounting of as heavy an object as a driving motor upon the car truck requires in ordinary practice exceptionally strong supporting elements, for the car truck is subjected to rapid impact loads as the car moves along the track. The provision of this normally required strength to counteract the impact loads is obviated in the present case by providing resilient wheels which are capable of absorbing a large portion of the impact shock. In this way, an exceptionally light truck may be used even though it carries a driving motor outboard on opposite sides of the truck.

Since the car of this invention is characterized by its light-weight and high speed, its resistance to air becomes an exceedingly important factor. Cross winds which have no marked effect on conventional railway cars may very easily overturn a high speed light-weight car unless the car body is properly shaped to resist the overturning force. Curiously enough, a wind at an angle of 16° to the direction of travel produces the greatest overturning effect and at the same time offers substantial resistance to car movement. Therefore, in order to give the car stability upon the track and to minimize the resistance of air to forward travel, the car body of this invention is shaped with these problems in mind, and, furthermore, with a consideration of such limiting factors as the A. R. A. clearance line, the passenger space required, the appearance of the car, etc.

The illustrative embodiment of the invention, which is shown in diagrammatic perspective in Fig. 6, clearly shows the application of the several fundamental concepts mentioned above to the general organization of the car.

The car body, it will be observed, comprises a space framework 50, of metal tubing, that is welded together to form a rigid unitary body. The framework is covered by a metal skin 51, which is secured to the framework and assists in resisting torsional strain.

The body is supported by a front truck 52 and a rear truck 53, the former having internal combustion engines 54 and 55, mounted outboard on opposite sides of the truck. The front truck includes wheeled axles 56 and 57, diagonally opposite ends of which are driven by the motors 54 and 55. The other diagonally opposite ends of the axles 56 and 57 are equipped with brake operating mechanism, generally indicated at 58. In other words, each of these axles has means for driving it at one end and brake mechanism at its other end.

The rear truck 53 includes wheeled axles 59 and 60, each of which are braked by mechanism corresponding to the mechanism 58 of the front truck.

The driving motors are preferably either gasoline or Diesel engines, and each has a horsepower rating of 160 or more, the exact rating, of course, being dependent on the performance desired.

The axles of both front and rear trucks are equipped with what may be termed "resilient" wheels, and this term is intended to include all forms of wheels which are inherently resilient either by the interposition of rubber under shear, pneumatic tires, springs, or by any other means.

The car body rests upon swing bolsters 61 and 62 of the front and rear trucks, respectively, and, preferably, the bolsters are equipped with cantilever springs 63 which are shackled to swing hangers 64 pivotally suspended from the truck frames.

The truck frames of each truck are fabricated of metal tubing welded together in such manner as to produce space frameworks of necessary strength, and at the four corners of each frame, a leaf spring 65 projects toward the adjacent axle where it connects to a journal 66. The point of connection between the projecting spring and the journal, is, in each case, beneath the axle, so that the truck is underslung with respect to the axles.

Driving and braking forces applied to the car axles are transmitted to the truck frames by radius rod 67. Other radius arms 68 which connect the worm gear casing 69 to a fixed point on the car truck—in this case, the transmission housing 70—take the thrust of the driving worm. Braking forces are resisted by torque arms 71 which connect the brake housing 72 to the truck frame.

The exterior of the car is best illustrated in Fig. 1, the front of the car being to the right. The body, as will be seen, is elongated and has a tapering blunt nose and tail to reduce wind resistance. The outer surface of the car consists of smooth broad curves well blended together to produce a graceful appearance, and at the same time directing the air currents around the car with minimum effort. The windows 73 are flush with the outer skin, and are made stationary, as it is contemplated that a forced system of ventilation will be used.

The bottom of the car is uninterrupted in outline, except for the wheels of the truck which project through the metal skin enveloping the body framework.

The interior of the car is shown in Fig. 7, and the reference character 74 designates the motorman's seat; 75 and 76 baggage compartments; 77 the main passenger space; 78 and 79 lavatories; and 80 the observation salon.

The engine radiators are mounted horizontally in the spaces 81 and 82, leaving a space 83 on one side of the car which may be advantageously used for electrical equipment, such as batteries, dynamos, etc.

Body shape

It is totally impractical to shape the car body so that it most effectively reduces wind resistance. In the first place, a perfectly streamlined body presents a somewhat grotesque appearance and certainly is not pleasing to the eye. It may be said that a car shaped so as to offer the absolute minimum resistance to air currents would not respond to the art fundamental, a term which is used in art to signify certain relative proportions which have been found to have grace, symmetry and pleasing appearance. It is, therefore, desirable to sacrifice some of the advantages of reduced wind resistance in order to give the car a graceful appearance.

The American Railway Association clearance line (Figs. 3 and 5) imposes another limitation upon the shape of the car. The clearance line, as is well known, fixes the outside limits for car body contour, including all equipment that is carried by the car. No part of the car is supposed to project beyond this limiting line, and all American car builders respect the rule.

A third limiting factor which forces a compromise in the shape of the body is the interior space required for passengers and baggage. The car body must be sufficiently wide at its base to give reasonable seating capacity. But at the top it need not be as wide. The sides of the car may, therefore, taper inwardly toward the top, and this enables cross winds to be properly dealt with.

A body shape which satisfies the three principal requirements set forth above is one which is substantially ovate in cross section and is provided with a tapered blunt nose and tail. Wind tunnel tests have demonstrated that such a shape has low wind resistance both as against a front wind and a cross wind. In addition, the car is graceful, affords ample passenger space, and can easily be made within the American Railway Association clearance lines.

By referring now to Figs. 1, 2, 3 and 16-28, inclusive, a more accurate conception of the body shape may be discerned. It will first be observed that all lines of the body are blended together with smooth broad curves and that there are no projections which impede the flow of air over the surface of the car.

The general ovate, cross sectional shape, as shown in Figs. 16-28 has several distinct advantages over conventional cross sections. Air currents striking the side of the car (Fig. 3) at right angles to the longitudinal axis of the car are carried along the upper and lower curved surfaces with comparatively little resistance and since the side of the car tapers upwardly, there will be but a small area at the side of the car which produces eddy currents. On the lee side of the car, there is a relatively small low pressure area, as indicated in Fig. 3, for in the same manner that the smooth curves and sloping side wall carry the air currents over and beneath the car on the windward side so also do they tend to reduce the low pressure on the lee side.

A comparison of the air currents in Fig. 3 with those in Fig. 5 shows clearly the advantage of the ovate, transverse, cross section as compared with a standard Pullman car.

The shape of the car in plan also contributes to the low wind resistance which it offers to forward movement. Since the nose and tail are blunt and tapered, air currents striking the car from the most unfavorable angle, viz. 16° from the direction of travel, will follow generally the contour of the body and will produce a much smaller low pressure area on the lee side than the ordinary Pullman car (Fig. 4).

It has already been stated that the possibility of overturning the car becomes a very important consideration when the car is made of lightweight materials and travels at a high rate of speed. The relatively small low pressure area on the leeward side combined with a reduced high pressure area on the windward side effectively eliminate the possibility of overturning the car by wind resistance. The overturning effect is further minimized by the fact that the car body rests relatively low upon the supporting trucks so that the force of the wind acting through the center of pressure, indicated by C. P. in Figs. 3 and 5, has a relatively short lever arm as compared with the lever arm in an ordinary car. The blunt tapering nose and tail in their vertical projection have the same effect upon breaking the wind as the sides of the car have in allowing cross winds to slip easily over and beneath the car.

The transverse cross-sections, taken adjacent the ends of the car, are more truly egg-shaped or ovate than the intermediate sections, but for convenience the term ovate will be used to designate the characteristic shape which includes upwardly tapering side walls and smoothly rounded top and bottom walls. As the intermediate sections are fuller and more nearly round than the end sections, the term ovate rotundate may be used to more specifically describe their shape.

Preferably the car trucks are provided with a metal skin 89 in the form of a pan, which carries out the reduced wind resistance effect, but does not interfere with the relative movement between the truck and body. The pan is secured to the bottom of the truck frame by screws, or other suitable means.

*Body fabrication*

Conventional railway cars weigh from 110,000 to 150,000 lbs. or more. This great weight is brought about by the use of a heavy underframe, in some cases a one piece casting, and by the use of relatively heavy side, end, and roof frameworks. The trucks also add greatly to the weight of the car and usually heavy metal plates are either welded or riveted to the side and end frames to further increase the weight of the car.

Since one of the prime objects of the present invention is to reduce car weight and thus to obtain greater operating efficiency from given power, an entirely different principle of car construction is used.

In proportion to its weight, a tube is the strongest columnar structural element known. This relationship is commonly expressed by saying that it has a relatively high form factor. It is, therefore, used as the basic unit of the rail car of this invention. It will be understood that the word "tube" is not limited to round tubing, but includes tubing that is square, or any other polygonal tubing.

Not only is the tube used as a basic structural element in the car, but the car as a whole is in the form of a tube and thus has great strength in proportion to its weight.

All joints in the body are preferably welded together, so that fittings are totally eliminated. If fittings were used the weight of the car body would be materially increased.

The body framework, generally designated 50, consists of a plurality of steel tubes 90, having their intersecting ends rigidly welded together as indicated at 91. Wherever there is need for a particularly strong joint, the tubes are slit, as shown in Fig. 32 to receive a reinforcing plate or gusset 92 which is then welded to the tubes as indicated at 93 and the tubes themselves welded together, as indicated at 94.

The body framework 50 as a whole constitutes a space framework consisting of a plurality of ovate shaped sections 95 held in spaced relation by the connecting tubes 90 with the lower portion of the framework built up to form a floor truss or understructure 96 which extends the full length of the car.

Since the car body is to rest well down upon the car trucks, it is necessary to construct the floor truss so that there are cut-away portions 97 and 98 which are adapted to accommodate the driving motors on the front truck. The cross bracing shown in Figs. 14 and 15 well compensates for the smaller width of the floor truss adjacent the front of the car. In addition the tubing used for this narrow portion 99 of the floor truss is of heavier gauge than that used in the remainder of the car so that adequate strength is provided at this point.

The depth of the trussed understructure is also reduced at the narrowed section 99 and the same is true at the rear of the car where the rear truck supports the car body. This lessening of the depth of the understructure is indicated at 100.

Adjacent to the front and back of the car, additional truss work is used, as clearly shown in the drawings, to take the shock of minor impacts.

Since the truss work from front to rear and vice versa is interrupted by the door spaces 101 and 102 (Fig. 13) metal plates 103 having cut-out portions 104 are welded to the top of the door frames to give the necessary rigidity to the body framework at these points.

The truss work is carried from one side of the car to the other, not only through the understructure, but through bulkheads, such as are shown in Figs. 19, 20, 25, 26, 27 and 28. In Figs. 19 and 20, the bulkheads leave a passageway 105 and between the bulkheads, the lavatories are placed, as shown in Fig. 7. In Figs. 24–27 inclusive, bulkheads are shown which divide the interior space into baggage compartments (see Fig. 7). The bulkhead shown in Fig. 28 separates the cab from the rest of the passenger space and provides a doorway 106 for communication between the cab and passenger space.

The tubing as used in the body framework need not necessarily be of steel, but may be of aluminum, or some alloy which is particularly suited for the purpose.

The exterior of the framework 50 is substantially covered by a metal skin 51 which preferably completely encircles the car body except for the necessary openings to accommodate the car trucks. The skin may be made of aluminum, steel, or Dural, the latter being an alloy of aluminum which combines strength with light weight.

The skin is rigidly secured to the body framework by self-tapping screws 105' (Figs. 31 and 33). Preferably fabric strips are interposed between the tubes and the skin and between the layers of skin where two sections overlap in order to make the outer shell waterproof and noiseless.

Provision is made in the understructure for permitting the car body to be raised by jacks from the car trucks in case the car is derailed, or for the purpose of repair. These jacking pads 108 are built into the understructure, as shown most clearly in Figs. 13 and 18. The additional trusswork which forms a part of the jacking pads protects the rest of the body framework from damage by the application of a load at points spaced from the front and rear center bearing.

The center bearing structure, which is shown best in Figs. 29 and 30 differs from that generally used in railway cars. Ordinarily the car body carries a body bolster which has an aperture through which a center pin passes. In the present construction, a collar 109 is welded into the understructure at the two points where the front and rear trucks are swiveled to the car body. The collar is provided with four laterally extending wings 110' which serve as gussets in reinforcing the collar.

In Fig. 20 the bulkhead is slightly modified when the section is taken at 20', as shown by dotted lines. When so modified, the portion 107 on the left side (Fig. 20) is eliminated, and also the tube 108' on the right side.

The total weight of a car built in accordance with this invention, and having a load carrying capacity comparable to a conventional car, is from 35,000 to 40,000 pounds, using chrome molybdenum steel tubing for the space framework and oxyacetylene welded joints. The weight may further be decreased by using aluminum alloys in place of chrome molybdenum, but at greater expense.

The skin 51 is an important structural element of the car body. It gives the car much of its rigidity and serves effectively to resist torsional stresses. When made of aluminum alloys, such as Dural, it preferably has a thickness of from .03 to .06 of an inch.

The load reaction from the trucks, in addition to being taken up by the heavily trussed framework in the vicinity of the center bearings, is transmitted in part through the adjacent bulkheads to the side of the roof structure, including the metal skin, so that the entire car assists in resisting bending stresses.

It will be observed, too, that the fore part of the car is designed to take the shock of collision, for while it would crumple if the shock were sufficiently great, yet the energy absorbed by the local crumpling would protect the remainder of the car from serious damage and reduce the possibility of fatal injury to the passengers.

The pockets in the car body which receive the driving engines may, of course, be open at the sides.

Truck frames

The front and rear truck frames 110 and 111, respectively, are substantially identical, the principal difference between the two being that the former, in addition to being made of heavier gauge tubing, is provided with the necessary outrigging for supporting the driving motors. Since the two frames are so nearly alike, only one will be described in detail, and corresponding elements will be identified in the drawings by like reference characters.

The rear truck frame 111, which is best shown in Fig. 11, comprises a space framework made up of a plurality of metal tubes, preferably of steel, arranged to resist the forces which act upon the truck and having their intersecting ends welded together to form a rigid unitary structure.

At the four corners of the framework are spring housings 112, each of which consists of a bell-shaped casting that is welded into the space framework. Integrally cast upon the upper portion of the housings are spaced lugs 113, which are adapted to receive pins 114, for securing the inner ends of the radius rods 67 to the truck frame.

The open end of each bell housing 112 faces toward the adjacent axle, and is adapted to receive the semi-elliptical springs 65, which are shackled in the housings by bolts 115, which pass through suitable reinforced apertures at the rear of the housings. The housing 112, instead of being cast, may be built up by welding steel plates together of appropriate size and form.

The four spring housings are joined together by transverse, tubular members 116 and 117 and 118 and 119, respectively, and by longitudinal tubular members 120 and 121, each of these tubular members being securely welded to the spring housings.

Since the bolster 62 must be capable of swinging laterally, swing hanger bearings 122 and 123 are provided which preferably are somewhat above the tops of the spring housings 112. The bearings are in alinement with the side truss work and connect to the spring housings by tubular members 124 and 125, and 126 and 127, respectively. Suitable vertical and horizontal tubular truss work join the sides and ends of the frame so that the necessary strength and rigidity is obtained. It will be noticed, however, that this truss work is carried inwardly and downwardly from the swing hanger bearings 122 and 123 in such manner that suitable clearance is allowed for the lateral movement of the swing bolster 62.

The welded joints between intersecting tubes may be reinforced by gusset plates in the manner which was previously described with particular reference to Fig. 32. An example of such a joint in the truck frame is indicated at 128.

The swing hanger bearings 122 and 123 are flanked by bearing disks 129 which telescope over the bearings 122 and 123 and are welded to gusset plates 130 which constitute a part of the adjacent joints.

The forces which act upon the truck framework create a rather large shearing stress between the spring housings and the connecting cross members 116, 117, 118 and 119. To counteract this stress, ribs 131 are welded to the inner sides of the housings and the connecting cross members, and in order to prevent the ribs from buckling, plates 132 are welded at right angles to the ribs between the upper and lower transverse cross members 117, 116, 119 and 118, respectively.

All radius rods, torque arms and the like used on the truck frames are preferably equipped with rubber bushings to reduce noise and cushion shock.

It has previously been stated that the brake mechanism is applied to diametrical ends of the truck axles and that a torque arm 71 connects the brake housing 72 to the truck frame to prevent the latter from rotating on the axle. Since the brake mechanism is mounted on the exterior of the car wheels, it is necessary to provide an outrigger 141 for taking the thrust of the torque arm 71.

In the present embodiment of the invention, the outrigging consists of two parallel tubular members 133 and 134 welded to the exterior of the spring housings which are adjacent to the wheels carrying the brake mechanism. The ends of the tubes 133 and 134 are connected by a reinforced plate 135 which is provided with lugs 136 adapted to receive a retaining pin 137 for securing the torque arm 71 to the outrigging.

The tubes 133 and 134 are trussed vertically by a tube 138 and a reinforcing construction 139 similar to that on the interior faces of the housings 112, it being provided to counteract the shearing stress. A horizontal tubular truss member 140 is welded between the tube 133 and the tube 121, the intersection being directly beneath the bearing disk 130 nearest to the outrigging. A similar truss member 140' connects the tube 134 to the same joint.

*Engine mounting*

Except for the use of heavier gauge tubing, the front truck requires little modification to enable it to carry driving engines. The outrigging 141 remains the same except that the plate 135, Fig. 11, is replaced by a built-up box-like structure 142 (Figs. 36 and 38) which has reinforced apertures 143 in its side walls through which the retaining pin 137 of the torque arm 71 passes. The point of attachment for the torque arm being slightly lower than it is shown in Fig. 11, it results that the brake housing 72 is rotated slightly more to the left in the front truck than it is in the rear truck.

Each driving motor is supported on the truck frame by three attachments, one being directly beneath the flywheel, a second being at the front of the motor, and a third being a connection between the upper part of the truck frame and the flywheel housing.

The rear motor support, which engages the bottom of the flywheel housing, requires a second outrigging 144 which consists of tubes 145 and 146, the former projecting substantially horizontally at right angles from the longitudinal frame member 121 so as to bring the rear point of support for the motor directly opposite the vertical tube 147 which takes part of the downward thrust from the swing hanger bearing 123. Vertical truss tubes 148, 149 and 150 fix the vertical position of the stub bearing 151 which is rigidly welded to the ends of the tubes 145, 146 and 149.

The stub bearing 151 consists of a short piece of tubing, in the outer end of which a plug 152 is welded, the latter being drilled and tapped, as indicated at 153. A collar 154 telescopes over the stub bearing and takes the inward thrust on the outrigging 144.

A rubber bushing 155, lined on both inside and outside with metallic sleeves, fits over the end of the stub bearing 151, and is secured in place by a bolt 156, assisted by a washer 157, the former screwing into the tapped hole 153 in the end of the stub bearing.

On the bottom of the flywheel casing 158 is a bracket 159, which is secured to the casing by bolts 160. The bracket has welded to its underside a sleeve 161, which is adapted to have a tight fit over the bushing 155, thus giving the motor a resilient lower support.

The front motor support consists of a pillow block or trunnion bearing 162, that is secured to the top of the housing 142 by bolts or equivalent means. The block has a circular recess 163, adapted to receive a collar 164 of rubber, lined on both inside and outside with metal rings. The front end of the motor is equipped with a circular boss 165, adapted to fit within the resilient collar 164, thus giving the front end of the motor a slightly yieldable support.

The motor is stabilized upon the front and rear supports by a clevis 166 which is secured by a bolt 167 to a boss 168 on the flywheel casing. The clevis has a horizontal cylindrical portion 169 fitted with a resilient bushing 170 similar to the bushing 155 of the lower motor support, and a bolt or retaining pin 171 passing through upstanding ears 172 on the truck frame, rigidly secures the clevis to the frame. The clevis lies in substantially the same vertical plane which includes the lower motor support and the tubular members 145, 147, 148, 149 and 150.

An alternate arrangement for the rear motor support is shown in Fig. 39. In this case two cylinders, at right angles to one another, are carried by the bracket 159, and each is equipped with a rubber bushing. This arrangement simulates a universal joint and has corresponding advantages.

*Resilient wheel*

Every time a car truck passes over a rail joint, an impact is delivered to the truck which may be several times the normal load. Ordinarily this necessitates understructure designed to take the additional load, and in order for this to be done, the structure must be proportionately heavier.

Engineers for some time past have endeavored to develop a resilient wheel which would make car riding more comfortable and less noisy. All manner of devices have been used to introduce the desired resiliency in the car wheel, but they have failed for some reason or other. Whenever rubber was used, it was found that the continual distortion of the rubber generated so much heat that it soon burned up.

It has recently been discovered that rubber may be subjected to enormous shearing stresses if it is first placed under compression at right angles to the shearing stress. It is this principle which is utilized in the resilient wheel shown in the drawings and hereinafter described.

The wheel is shrunk upon the supporting axle and comprises a web 180 and a hub 181. A hardened steel tire 182 having a depending flange 183 is placed over the web with an annulus 184 of high grade rubber interposed between the flange 183 and the wheel web. The web is slightly shouldered, as indicated at 185 to support the annulus in place.

A similar annulus 186, also of high quality rubber, is placed on the other side of the wheel web, and the two annuli are then compressed against the web by applying pressure to a hard metal rim 187 which is then locked in place by a ring 188 which seats within a suitable groove in the wheel tire. The inner surface of the wheel tire does not contact with the wheel web so that the entire load of the car on the wheel is transmitted from the wheel web 180 to the tire 182 through annuli 184 and 186 which are continually under shear.

By using resilient wheels in place of the ordinary solid wheels, the fabrication of a light weight car truck from metal tubing becomes feasible.

*Axle drive*

The automatic transmission assembly preferably has three speeds forward and one for reverse, the first two forward speeds acting as free wheeling units. The transmission is entirely automatic in operation, and is made in accordance with the disclosures in United States Patents Nos. 1,843,193, 1,843,194 and 1,843,195, issued February 2nd, 1932, and No. 1,851,147, issued March 29th, 1932, No. 1,851,146, issued March 29, 1932.

The great advantage which arises from using automatic transmissions in combination with the general truck organization is that it is unnecessary to carry gear shift connections from the transmission to the motorman's cab at the front of the car body. The gears are shifted automatically by manipulation of the engine throttles.

The driving connections between the motors and the car axles may, of course, assume various forms, but in the present embodiment of the invention a worm drive is employed. The worm and worm gear, which are enclosed within the housing 69, operate in the usual manner to rotate the driven axle, and two universal joints 189 and 190 (Fig. 10) are interposed in the drive shaft 191 to take care of slight relative movement to the gear casing and the motor.

The worm is, of course, provided with thrust bearings at the ends of the worm, and the entire assembly is supported on the axle by roller bearings of which there is at least one on opposite sides of the worm gear.

Brakes

The brake operating mechanism, which is located at diagonally opposite ends of the car axles, includes brake shoes (not shown) which are adapted to engage the inner surfaces of the brake drums 195. The brake housing 72 carries an air cylinder 196 which is adapted to force the arms 197 and 198 (Fig. 10) in opposite directions whereby suitable cams, not shown, are rotated to apply the brake shoes to the brake drum.

The driving motors are each equipped with suitable pulleys for operating air compressors to supply the necessary compressed air to the air brake cylinders.

Spring bolster assembly

The spring bolster assembly is best shown in Fig. 29, although reference to Figs. 10 and 11 may be of assistance. As the assemblies are the same for both front and rear trucks, it will only be necessary to describe one in detail.

The bolster 61 comprises a casting having openings adjacent each end for receiving the quarter elliptical springs 63. The springs are fastened in place by bolts 210 which clamp retaining plates 211 against the bottom of the springs. The ends of the springs—there being two projecting from each end of the bolster—engage pins 212 which connect adjacent swing hanger arms 213. The upper ends of the swing hangers are pivotally clamped to the swing hanger bearings 122 and 123 and have rubber bushings 214 interposed between the bearings and the clamps so that the swinging motion of the bolster is resisted by rubber under shear. Flexible members 428 may be and preferably are, provided for limiting the swinging motion of the bolster.

The central portion of the bolster is formed with upper and lower circular depressions 215 and 216, respectively, the two depressions being separated by an annular dividing wall 217 having a vertically extended bearing surface 218 at its inner margin. Rubber annuli 219 and 220 are placed in the top and bottom depressions 215 and 216, respectively, and a truck center plate 221, in the form of a mushroom collar, rests upon the upper annulus and has its shank extending through the opening of the wall 217.

A center pin 222 passes through the body collar 109 and the mushroom collar 221, and receives at its lower end a retaining cap 223 which is held against the lower annulus by a nut 224 which is threaded on the end of the center pin 222.

In the construction above described, the rubber annulus 219 supports the weight of the car body and cushions the body from shock that would otherwise be transmitted through the center bearing. The lower annulus 229 serves to absorb rebound.

The bearing surface between the truck center plate 221 and the car body includes an inclined face which normally holds the car truck in alinement with the car body, but which causes the car body to be slightly lifted when the truck turns with respect to the body so that the force of gravity will tend to return the car truck to its normal position.

Side bearings

The bolsters 61 and 62 are each equipped at their ends with side bearings generally designated 230 which consist essentially of a side bearing bracket 231 securely welded to the body framework, and which carries on its underface a rubber backed plate 232 of self lubricating material which is adapted to slide upon a chrome-finished wear plate 233 carried at the end of the bolster.

The side bearings, it will be understood, limit side sway of the car body with respect to the car trucks.

Removable panels opposite motors

In order to permit ready inspection of the motors, a hinged panel 240 is provided which affords easy access to the motor. The hinged joint is shown in Fig. 34; and a side elevation of the panel in Fig. 31.

In case it is necessary to remove a motor for repair, a panel 241 may be removed exposing the body framework. As the tubular members 242 and 243 would interfere with the removal of the motor, they are made detachable by providing joints such as shown in Fig. 32.

The removable panel 241 is secured in place by screws 244 which engage brackets 245 welded to the adjacent tubular members. The hinged panel 240 is directly below the removable panel and is supported in part by the former. Obviously both panels could be removed as a unit if desired.

I claim:

1. A relatively light, high speed railway car comprising a car body, a car truck supporting the body, said truck including wheeled axles, and a truck frame of a length less than the distance between said axles and underslung from said axles, and driving motors carried outboard on opposite sides of the truck whereby the body may rest relatively low upon the truck.

2. A railway car characterized by its low center of gravity and comprising a car body, a pair of car trucks for supporting the body, one of said trucks being a power truck comprising a pair of wheeled axles, a truck frame carried on the axles, motors mounted outboard on the truck frame and on opposite sides thereof, one driving exclusively the adjacent end of one axle and the other driving exclusively the adjacent end of the other axle, leaving the truck frame free of driving mechanism between the gauge line of the wheels, said body having pockets for receiving the motors whereby the body may rest relatively low upon the truck.

3. A railway car characterized by its low center of gravity and comprising a car body, a pair of car trucks for supporting the body, one of said trucks being a power truck comprising a pair of wheeled axles, a truck frame underslung from said axles, motors mounted on the truck frame outboard and on opposite sides thereof, one driving exclusively the adjacent end of one axle and the other driving exclusively the adjacent end of the other axle, leaving the truck frame free of driving mechanism between the gauge line of the wheels, said body having pockets for receiving the motors whereby the body may rest relatively low upon the truck.

4. A high speed, light weight railway car comprising a car body formed of space framework to which a metal skin is rigidly secured, a pair of trucks for supporting the body, at least one of which is equipped with driving motors mounted on the truck on opposite sides outboard thereof, said truck being fabricated of metal tubing having intersecting ends welded together and trussed to resist body weight, driving and braking loads, said car body including an understructure having a narrowed portion adjacent to said truck whereby the body may rest relatively low upon the truck.

5. A high speed, light weight railway car comprising a car body formed of space framework to which a metal skin is rigidly secured, a pair of trucks for supporting the body, at least one of which is equipped with driving motors mounted outboard on the truck frame and on opposite sides thereof, said body having pockets for receiving the motors whereby the body may rest relatively low upon the truck.

6. A relatively light, high speed railway car comprising a pair of trucks, wheeled axles supporting the trucks, driving motors mounted outboard on one of said trucks and on opposite sides thereof, and a car body pivotally supported on a truck, said body comprising skeleton framework including an understructure having a narrowed portion adapted to be supported on said truck below the tops of said motors, said body having vertical pockets adjacent to the narrow portion of the understructure to receive the driving motors so that the body may rest relatively low on the truck and still permit relative movement between the body and said truck.

7. A self-propelled, high speed, light-weight railway car comprising a pair of swivel trucks, wheeled axles supporting the trucks, one of said trucks having a truck frame supported on the axles with internal combustion engines mounted outboard on the truck frame and on opposite sides thereof, each engine driving an end of one of said axles, and a light-weight car body supported on the trucks and having pockets for receiving the engines whereby the body may rest relatively low upon the truck.

WILLIAM B. STOUT.

CERTIFICATE OF CORRECTION.

Patent No. 2,056,217.  October 6, 1936.

WILLIAM B. STOUT.

It is hereby certified that error appears in the printed specification of the above numbered patent requiring correction as follows: Page 1, first column, line 2, for the word "united" read suited; page 2, second column, line 31, for "lower" read low; and that the said Letters Patent should be read with these corrections therein that the same may conform to the record of the case in the Patent Office.

Signed and sealed this 5th day of January, A. D. 1937.

Henry Van Arsdale
Acting Commissioner of Patents.

(Seal)